(12) United States Patent
Manahan et al.

(10) Patent No.: US 8,992,649 B2
(45) Date of Patent: Mar. 31, 2015

(54) EXPLOSION-PROOF ENCLOSURES WITH ACTIVE THERMAL MANAGEMENT USING SINTERED ELEMENTS

(71) Applicants: Joseph Michael Manahan, Manlius, NY (US); Marc Raymond Kozlowski, Cicero, NY (US)

(72) Inventors: Joseph Michael Manahan, Manlius, NY (US); Marc Raymond Kozlowski, Cicero, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/956,966

(22) Filed: Aug. 1, 2013

(65) Prior Publication Data
US 2013/0312948 A1 Nov. 28, 2013

Related U.S. Application Data

(63) Continuation of application No. 12/435,807, filed on May 5, 2009, now Pat. No. 8,512,430.

(51) Int. Cl.
| | | |
|---|---|---|
| *B01D 59/50* | (2006.01) | |
| *B01D 41/00* | (2006.01) | |
| *B01D 45/00* | (2006.01) | |
| *B01D 46/00* | (2006.01) | |
| *B01D 47/00* | (2006.01) | |
| *B01D 49/00* | (2006.01) | |
| *B01D 50/00* | (2006.01) | |

(Continued)

(52) U.S. Cl.
CPC ... *F28F 7/00* (2013.01); *A62C 4/00* (2013.01); *H02K 5/136* (2013.01)
USPC ............. 55/482; 55/471; 55/385.1; 55/385.2; 55/438; 55/439; 361/638

(58) Field of Classification Search
CPC ..... B01D 2279/30; Y02T 10/20; F01N 3/022; Y10S 55/10; Y10S 55/30
USPC ............. 55/482, 573, 385.1, 385.2, 438–439, 55/471; 361/698, 638
See application file for complete search history.

(56) References Cited

U.S. PATENT DOCUMENTS

| | | | |
|---|---|---|---|
| 1,838,505 | A | 12/1931 | Shurtleff |
| 2,265,317 | A | 12/1941 | Schlirf |

(Continued)

FOREIGN PATENT DOCUMENTS

| | | |
|---|---|---|
| JP | 63105306 | 5/1988 |
| JP | 02233908 | 9/1990 |
| JP | 11297334 | 10/1999 |

OTHER PUBLICATIONS

National Electrical Manufacturers Association, NEMA Enclosure Types, NEMA Standards Publication 250-2003 Enclosures for Electrical Equipment (1000 Volts Maximum), Nov. 2005, 9 pages.

*Primary Examiner* — Amber Orlando
(74) *Attorney, Agent, or Firm* — King & Spalding LLP

(57) ABSTRACT

Enclosures for use in hazardous areas include sintered filters for thermal management. The enclosures include an opening to which a filter holder housing and sintered filter are coupled. The enclosures can also include a second opening to which a vent or a second filter holder housing and sintered filter are coupled. The internal temperature of the enclosures can be actively managed by such a system because air within the enclosure can be displaced to and from the atmosphere through the sintered filters. Air from the atmosphere enters the enclosure via the second opening and exits the enclosure via the first opening.

20 Claims, 6 Drawing Sheets

(51) Int. Cl.
- *B01D 57/00* (2006.01)
- *B01D 59/00* (2006.01)
- *B01D 51/00* (2006.01)
- *H02B 1/20* (2006.01)
- *F28F 7/00* (2006.01)
- *A62C 4/00* (2006.01)
- *H02K 5/136* (2006.01)

(56) References Cited

U.S. PATENT DOCUMENTS

| | | |
|---|---|---|
| 2,395,298 A | 2/1946 | Shock, Jr. |
| 2,742,106 A | 4/1956 | Resko et al. |
| 2,789,238 A | 4/1957 | Staak |
| 2,801,768 A | 8/1957 | Immel |
| 2,973,832 A | 3/1961 | Cook et al. |
| 3,001,606 A | 9/1961 | Bierwith et al. |
| 3,170,504 A | 2/1965 | Lanning |
| 3,324,924 A | 6/1967 | Hailstone et al. |
| 3,536,158 A | 10/1970 | Blair |
| 3,635,599 A | 1/1972 | Bryant et al. |
| 3,652,810 A | 3/1972 | Weingartner |
| 3,810,732 A | 5/1974 | Koch |
| 3,841,520 A | 10/1974 | Bryant et al. |
| 4,274,262 A | 6/1981 | Reed et al. |
| 4,297,850 A | 11/1981 | Reed |
| 4,484,690 A | 11/1984 | Nash |
| 4,504,218 A | 3/1985 | Mihara et al. |
| 4,510,874 A | 4/1985 | Hasenack |
| 4,543,114 A | 9/1985 | Beattie et al. |
| 4,797,254 A | 1/1989 | Seidel |
| 4,823,554 A | 4/1989 | Trachtenberg et al. |
| 4,984,302 A | 1/1991 | Lincoln |
| 5,027,781 A | 7/1991 | Lewis |
| 5,057,006 A | 10/1991 | Follet et al. |
| 5,082,478 A | 1/1992 | Oono et al. |
| 5,094,236 A | 3/1992 | Tayebi |
| 5,139,673 A | 8/1992 | Martin |
| 5,191,990 A | 3/1993 | Fritts |
| 5,243,632 A | 9/1993 | Badin et al. |
| 5,269,146 A | 12/1993 | Kerner |
| 5,358,443 A | 10/1994 | Mitchell et al. |
| 5,456,164 A | 10/1995 | Bang |
| 5,496,389 A | 3/1996 | Wilcox |
| 5,505,046 A | 4/1996 | Nelson et al. |
| 5,524,440 A | 6/1996 | Nishioka et al. |
| 5,588,300 A | 12/1996 | Larsson et al. |
| 5,603,220 A | 2/1997 | Seaman |
| 5,609,032 A | 3/1997 | Bielinski |
| 5,661,978 A | 9/1997 | Holmes et al. |
| 5,718,124 A | 2/1998 | Senecal |
| 5,871,859 A | 2/1999 | Parise |
| 5,934,079 A | 8/1999 | Han et al. |
| 5,954,127 A | 9/1999 | Chrysler et al. |
| 6,003,319 A | 12/1999 | Gilley et al. |
| 6,021,642 A | 2/2000 | Guinn |
| 6,036,478 A | 3/2000 | Inada |
| 6,038,865 A | 3/2000 | Watanabe et al. |
| 6,144,309 A | 11/2000 | Fagence |
| 6,170,267 B1 | 1/2001 | Kitaoka |
| 6,293,107 B1 | 9/2001 | Kitagawa et al. |
| 6,294,721 B1 | 9/2001 | Oravetz et al. |
| 6,301,910 B1 | 10/2001 | Noritake et al. |
| 6,308,519 B1 | 10/2001 | Bielinski |
| 6,384,380 B1 | 5/2002 | Faries, Jr. et al. |
| 6,401,462 B1 | 6/2002 | Bielinski |
| 6,409,920 B1 | 6/2002 | Lee |
| 6,469,303 B1 | 10/2002 | Sun et al. |
| 6,481,213 B2 | 11/2002 | Carr et al. |
| 6,494,189 B1 | 12/2002 | Chu et al. |
| 6,533,031 B1 | 3/2003 | Garcia et al. |
| 6,574,967 B1 | 6/2003 | Park et al. |
| 6,599,341 B2 | 7/2003 | Goyetche |
| 6,823,831 B2 | 11/2004 | Chu et al. |
| 6,834,715 B2 | 12/2004 | Garcia et al. |
| 6,900,565 B2 | 5/2005 | Preston |
| 6,953,491 B2 | 10/2005 | Goyetche |
| 7,061,208 B2 | 6/2006 | Nishihata et al. |
| 7,384,704 B2 | 6/2008 | Scott |
| 7,625,415 B2 | 12/2009 | Durocher et al. |
| 7,764,497 B2 | 7/2010 | Becklin |
| 8,310,831 B2 | 11/2012 | Pal |
| 8,313,038 B2 | 11/2012 | Therrien et al. |
| 8,331,086 B1 | 12/2012 | Meissner |
| 8,347,781 B2 | 1/2013 | Stack |
| 8,349,481 B2 | 1/2013 | Nakamura |
| 8,353,167 B2 | 1/2013 | McGann |
| 8,424,316 B2 | 4/2013 | Tuszkiewicz et al. |
| 8,429,920 B2 | 4/2013 | Duval |
| 8,438,862 B2 | 5/2013 | Oman et al. |
| 8,459,497 B2 | 6/2013 | Milan et al. |
| 8,468,836 B2 | 6/2013 | Tuszkiewicz et al. |
| 8,490,413 B2 | 7/2013 | Blackway et al. |
| 2002/0152969 A1 | 10/2002 | Grigsby et al. |
| 2004/0008483 A1 | 1/2004 | Cheon |
| 2004/0103625 A1 | 6/2004 | Nakano et al. |
| 2006/0155073 A1 | 7/2006 | Oobayashi et al. |
| 2006/0254227 A1* | 11/2006 | Scagliarini ............... 55/385.4 |
| 2007/0119452 A1 | 5/2007 | Schubert |
| 2007/0285889 A1 | 12/2007 | Watson et al. |
| 2008/0124566 A1 | 5/2008 | Smallman et al. |
| 2009/0060246 A1 | 3/2009 | Baliga et al. |
| 2010/0022735 A1 | 1/2010 | Kanamori |
| 2011/0120067 A1 | 5/2011 | Kim |

* cited by examiner

EXPLOSION-PROOF ENCLOSURES WITH ACTIVE THERMAL MANAGEMENT USING SINTERED ELEMENTS

CROSS-REFERENCE TO RELATED APPLICATIONS

The present application is related to U.S. patent application Ser. No. 12/466,249, titled "An Enclosure System with Active Thermal Management by Heat Exchange" and filed on May 14, 2009, in the name of Joseph Michael Manahan et al, the entire disclosure of which is hereby fully incorporated herein by reference.

In addition, this patent application is a continuation application of and claims priority to U.S. patent application Ser. No. 12/435,807, entitled "Explosion-Proof Enclosures With Active Thermal Management Using Sintered Elements" and filed on May 5, 2009, the contents of which are fully incorporated by reference herein.

TECHNICAL FIELD

The invention relates generally to explosion-proof enclosures, and more particularly, to explosion-proof enclosures having active thermal management capabilities using sintered materials.

BACKGROUND

Automation equipment can be used to preserve the life of devices such as motors and pumps by improving device performance. However, the installation of automation equipment in hazardous or explosive environments typically has been avoided due to the high heat generated by components of the automation equipment, which could result in an explosion. Hazardous area requirements dictate that such equipment must be sealed from the surrounding atmosphere to fully contain any possible sources of ignition within the enclosure, thus preventing propagation of an explosion.

The automation equipment could potentially be housed in an explosion-proof enclosure. Currently, explosion-proof enclosures rely on conductive heat transfer for dissipating heat produced by equipment within the enclosure. However, these enclosures do not adequately dissipate the heat produced by the automation equipment within and thus could cause a decrease in the life of the equipment or lead to an explosion within the enclosure. As a result, automation equipment is typically installed outside the boundaries of the hazardous area and long electrical cables are run to the devices within the hazardous area. Several disadvantages to this configuration exist. For example, this configuration results in lack of control at the device, as well as an increase in installation, and/or maintenance costs.

Therefore, a need exists in the art for an explosion-proof enclosure automation and other for equipment that can provide active thermal management in a hazardous area.

SUMMARY

The present invention can satisfy the above-described need by providing enclosures having sintered filters for use in hazardous areas. As used herein, the term "sintered filter" refers to any sintered element having channels that allow flow of air therethrough. Some sintered filters are thermally conductive and have the ability to remove some heat energy from a flame passing therethrough, and thus can "arrest" a flame passing therethrough. In other words, some sintered filters can prevent flame transmission by removing one element (heat) of the combustion triangle (oxygen, fuel, and heat).

The enclosures of the present invention include an opening to which a sintered filter system is coupled. In some aspects, the enclosures include another opening to which a vent or another sintered filter system is coupled.

The sintered filter systems typically include a filter holder and a sintered filter positioned within. The filter holders can be cylindrically-shaped, rectangular-shaped, or tapered. The sintered filters can be any shape. In some aspects, the sintered filters can be cylindrically-shaped, rectangular-shaped, or be shaped similar to an elliptic paraboloid. In some aspects, the sintered filters can be bolted to the enclosure without the use of a filter holder. The sintered filters can include channels that have a flame path of about one inch and a pore size of about 38.1 microns. In certain aspects, the sintered filters can include channels that have a pore size of about 101.6 microns.

The enclosures also can include at least one fan positioned proximate to one or both of the sintered filter systems. The fan can be controlled by a control system having a sensor and a controller. In one aspect of the invention, the fan forces air out of one of the sintered filter systems. As a result, atmospheric air is forced into the enclosure through the other sintered filter systems. In some aspects, the atmospheric air can be chilled air or warmed air for improved performance depending on ambient conditions. In another aspect of the invention, the fan pulls air into the enclosure via one of the sintered filter systems and air is forced out through the other sintered filter system.

In certain aspects of the invention, the enclosures can include a heating element for heating the air within the enclosures. The heating element can be controlled by a control system having a sensor and a controller.

These and other aspects, objects, and features of the invention will become apparent to those having ordinary skill in the art upon consideration of the following detailed description of exemplary embodiments exemplifying the best mode for carrying out the invention as presently perceived.

DETAILED DESCRIPTION OF EXEMPLARY EMBODIMENTS

Figure 1:
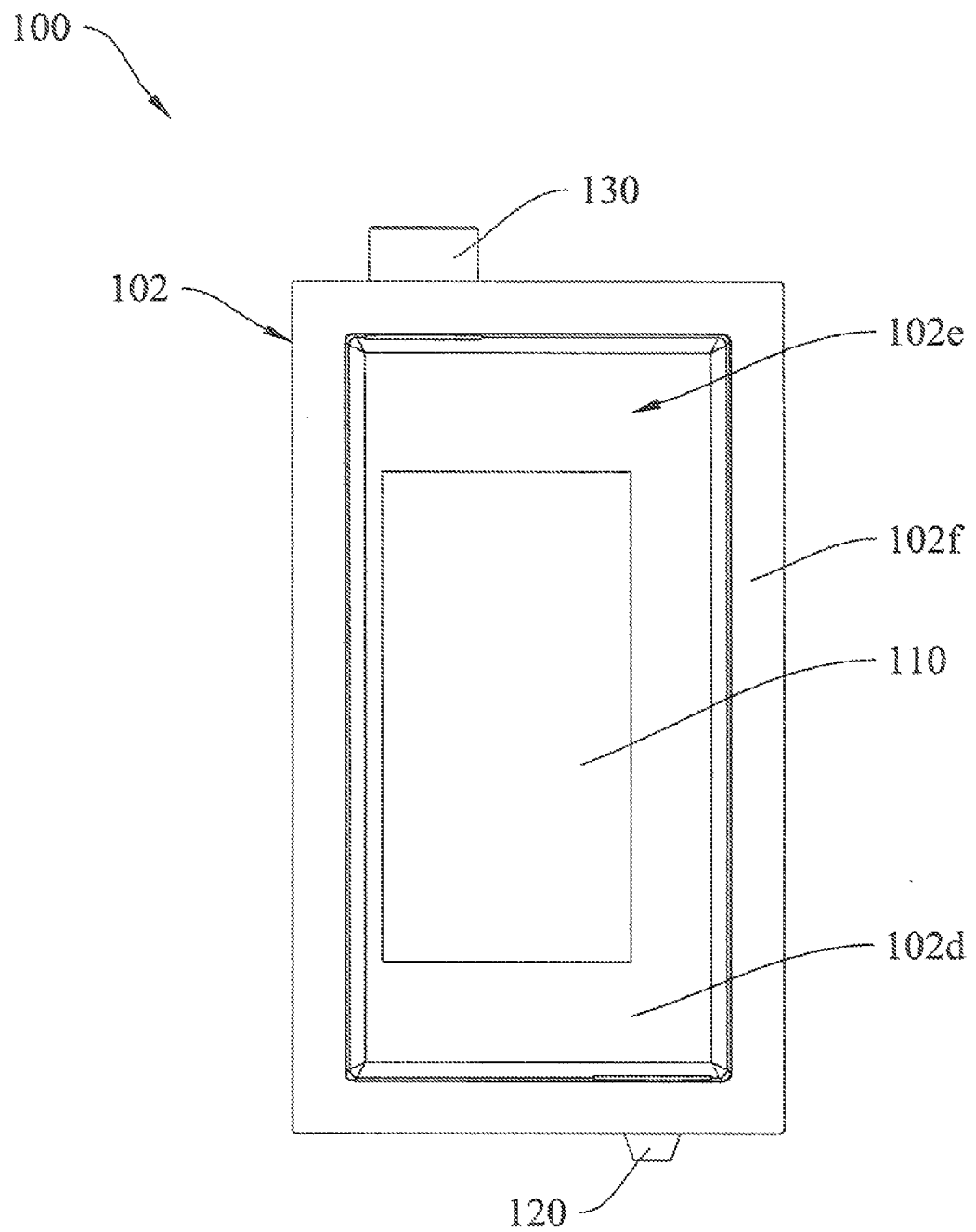
FIG. 1 is a front view of an explosion-proof enclosure with the cover removed according to an exemplary embodiment.

The application discloses enclosures having active thermal management capabilities. The enclosures include a sintered material that provides a vent to the atmosphere. The enclosures can be used for both general purposes and in hazardous areas.

The present invention may be better understood by reading the following description of non-limiting embodiments with reference to the attached drawings wherein like parts of each of the figures are identified by the same reference characters.

Figure 2:
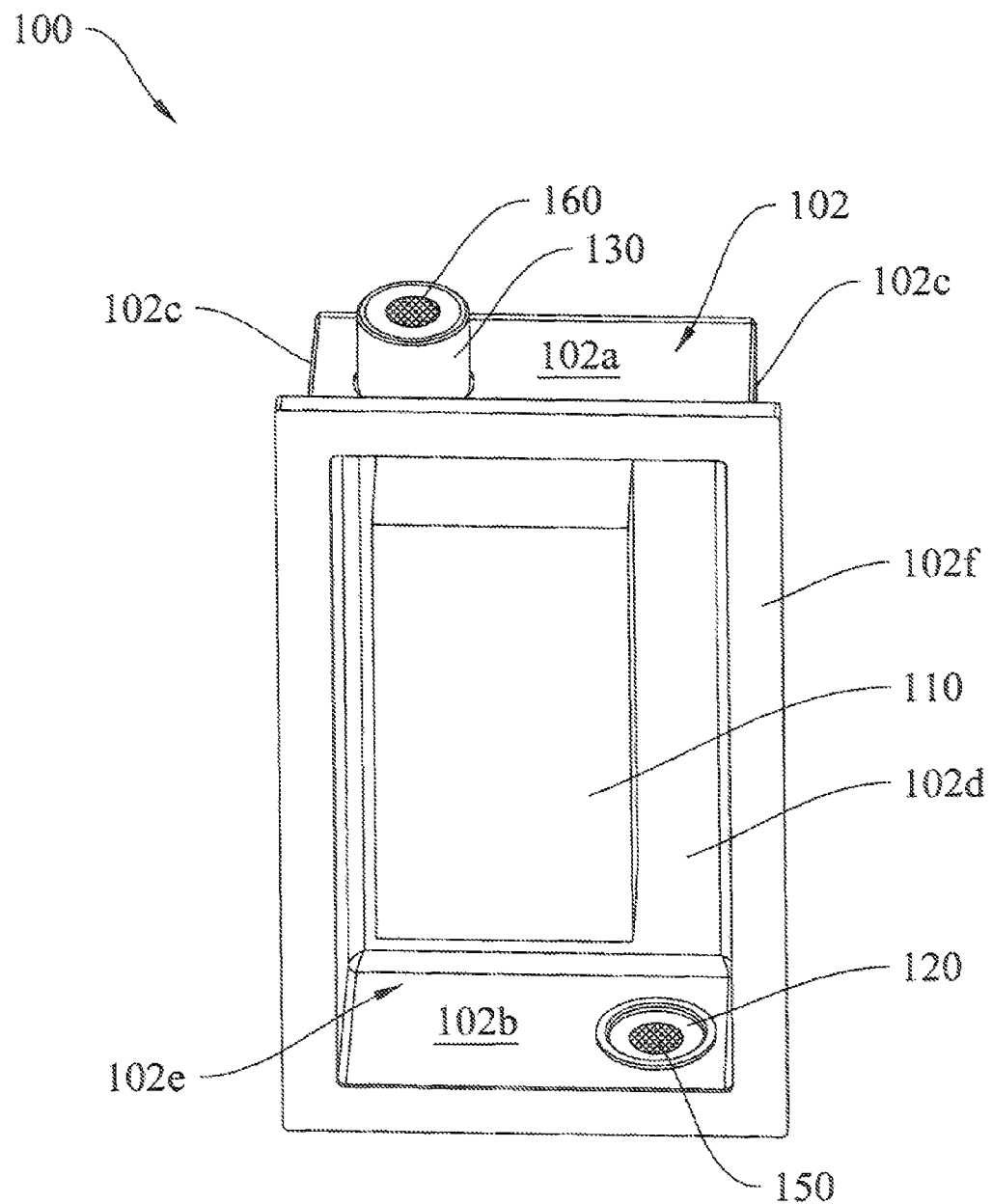
FIG. 2 is a top perspective view of the explosion-proof enclosure shown in FIG. 1 according to an exemplary embodiment.
Figure 3:
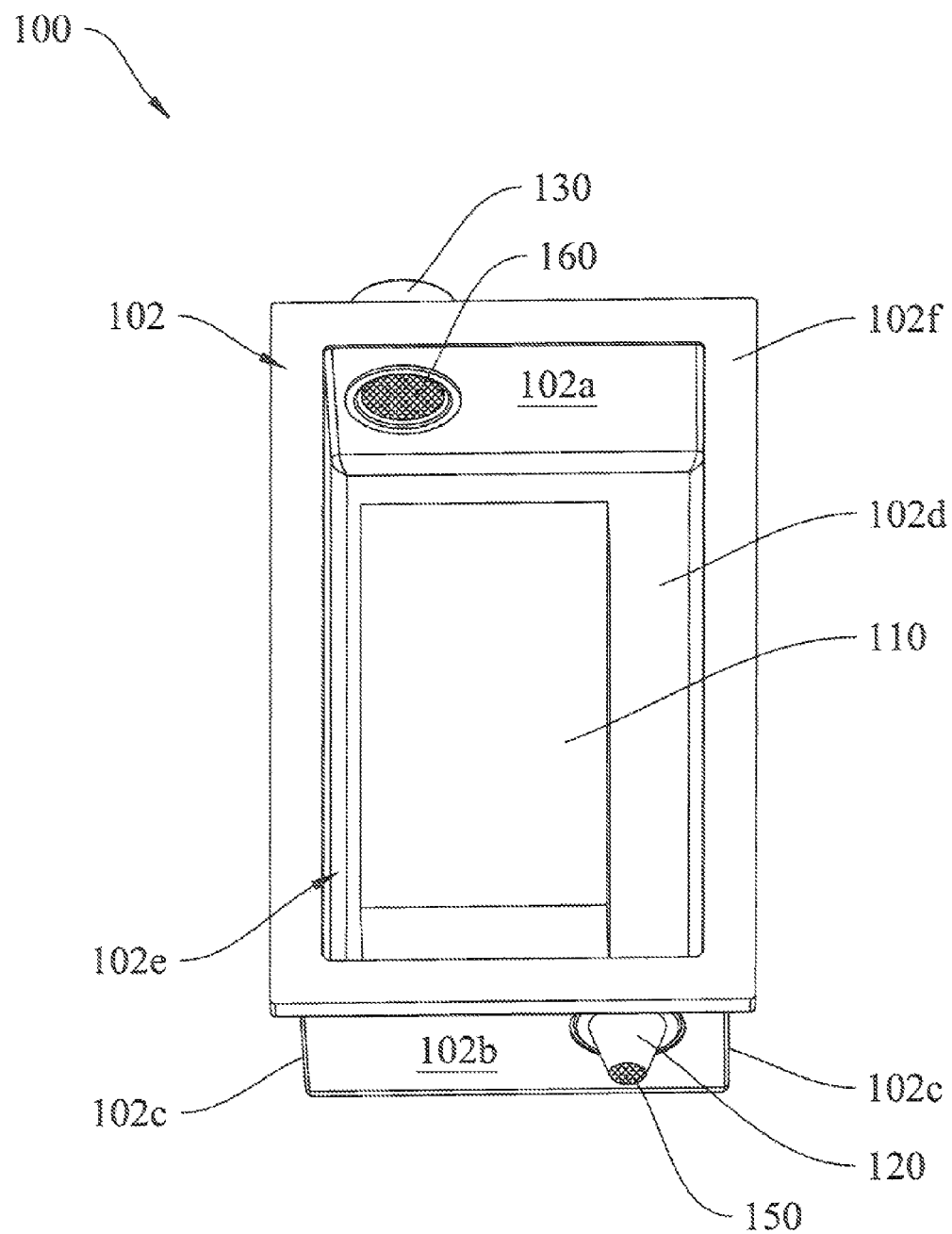
FIG. 3 is a bottom perspective view of the explosion-proof enclosure shown in FIG. 1 according to an exemplary embodiment.

FIGS. 1-3 are front, top perspective, and bottom perspective views of an explosion-proof enclosure 100 with a cover (not shown) removed according to an exemplary embodiment. The enclosure 100 includes a rectangular housing 102. The housing 102 includes a top wall 102a, a bottom wall 102b, two side walls 102c, a rear wall 102d, and a cavity 102e. The housing 102 also includes a flange 102f extending orthogonally from the top, bottom, and two side walls 102a, 102b, 102c. In certain embodiments, the housing 102 is constructed from aluminum and is a NEMA 7 compliant enclosure for indoor or outdoor use in hazardous locations classified as Class I, Groups A, B, C, or D.

The enclosure 100 also includes automation equipment 110 positioned within the cavity 102e and coupled to the rear wall 102d. In alternative embodiments, the automation equipment 110 can be coupled to the top wall 102a, the bottom wall 102b, or one of the side walls 102c. The automation equipment 110 produces heat within the enclosure 100 which should be dissipated to maintain a desired temperature within the enclosure 100. In certain embodiments, the automation equipment 110 may include a controller, such as a variable frequency drive (VFD) that controls the frequency of electrical power supplied to an external device, such as a pump or a motor (not shown). In certain embodiments, the automation equipment 110 may also include a transformer, a programmable logic controller (PLC), and/or a line reactor.

Figure 4:
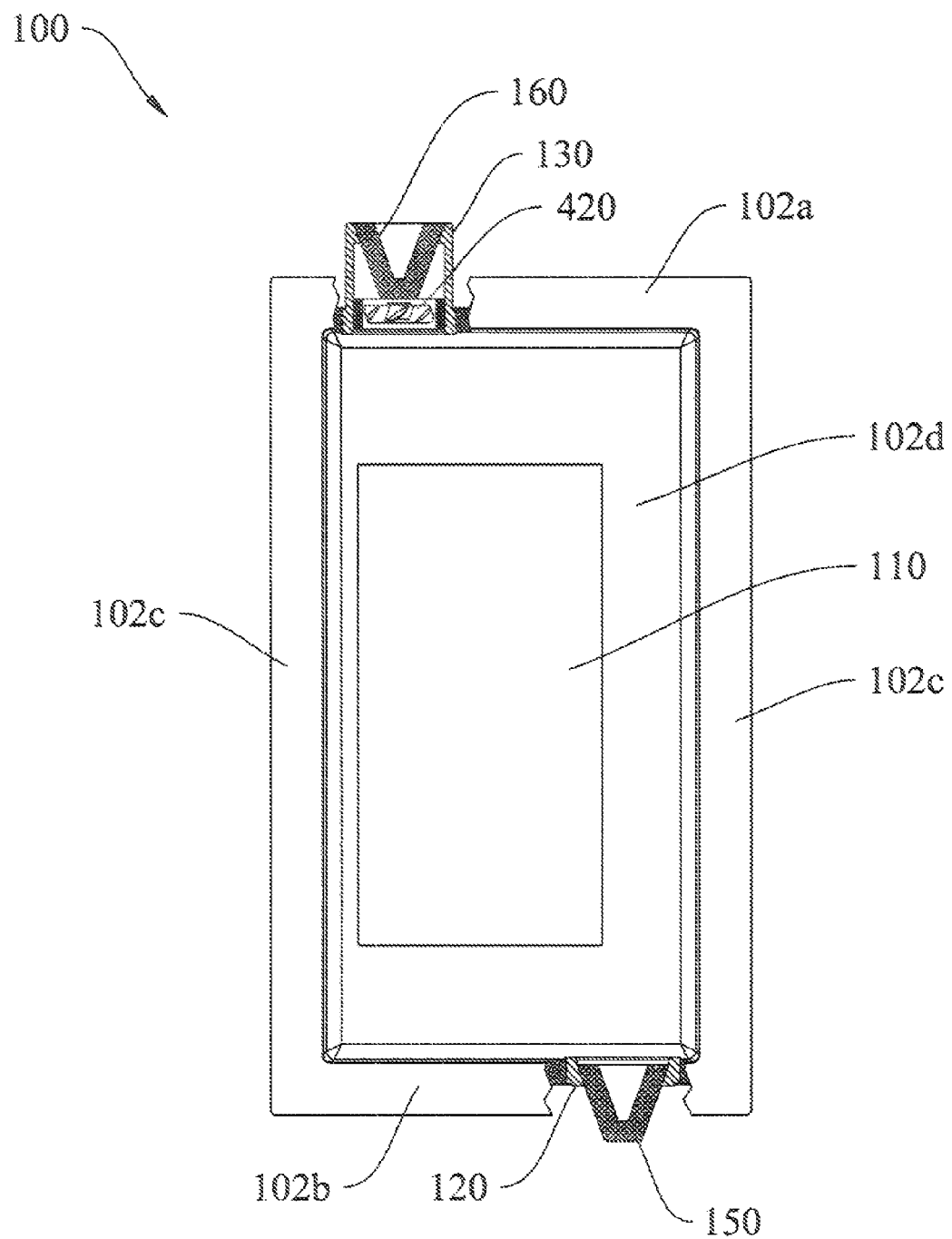
FIG. 4 is a cross-sectional view of the explosion-proof enclosure shown in FIG. 1 according to an exemplary embodiment.

The enclosure 100 also includes a filter holder 120 coupled to the housing 102. The filter holder 120 may be coupled to the housing 102 by any suitable means that can maintain the hazardous rating integrity of the enclosure 100, such as by mating threads or by bolting a flange (not shown) on the filter holder 120 to the housing 102. The filter holder 120 houses a sintered filter 150. In certain embodiments, the filter holder 120 and the sintered filter 150 are two separate pieces. In certain embodiments, the sintered filter 150 is sealed within the filter holder 120. In certain alternative embodiments, the filter holder 120 and the sintered filter 150 are integrated into a single sintered filter system. The filter holder 120 extends outwardly from the bottom wall 102b and has a variable sectional area from an end adjacent to the enclosure 102 to an opposite end. For example, the filter holder 120 can be tapered as shown in FIGS. 1, 3, and 4. In certain alternative embodiments, the filter holder 120 has a constant sectional area. The size and shape of the filter holder 120 and the filter 150 can be configured based on the amount of air flow desired.

The enclosure 100 further includes another filter holder 130 coupled to the housing 102. The filter holder 130 may be coupled to the housing 102 by any suitable means that can maintain the hazardous rating integrity of the enclosure 100, such as by mating threads or by bolting a flange (not shown) on the filter holder 130 to the housing 102. The filter holder 130 houses a sintered filter 160. In certain embodiments, the filter holder 130 and the sintered filter 160 are two separate pieces. In certain embodiments, the sintered filter 160 is sealed within the filter holder 130. In certain alternative embodiments, the filter holder 130 and the sintered filter 160 are integrated into a single sintered filter system. The filter holder 130 extends outwardly from the top wall 102a and has a constant sectional area. In certain embodiments, the filter holder 130 is cylindrically-shaped as shown in FIGS. 1, 2, and 4. In certain alternative embodiments, the filter holder 130 has a variable sectional area from an end adjacent to the enclosure 102 to an opposite end. The size and shape of the filter holder 130 and the filter 160 can be configured based on the amount of air flow desired.

FIG. 4 is a cross-sectional view of the explosion-proof enclosure 100 according to an exemplary embodiment. The filter holder 120 includes a sintered filter 150 positioned therein and the filter holder 130 includes a sintered filter 160 positioned therein. The sintered filters 150, 160 can be sealed within the filter holders 120, 130 to maintain the hazardous rating integrity of the enclosure 100. The exemplary sintered filters 150, 160 are shaped substantially similar to an elliptic paraboloid. The sintered filters 150, 160 have a thickness that is substantially uniform throughout. In certain embodiments, the sintered filters 150, 160 have a thickness of about one inch. The thickness of the sintered filters 150, 160 can vary as long as the path length of the apertures, or channels, within (described in detail with respect to FIG. 6) is approximately one inch.

The filter holder 130 also includes a fan 420 positioned within the housing 102 and proximate to the sintered filter 160. The fan 420 can be powered by an internal power source, such as a battery (not shown), or receive power from a source (not shown) external to the enclosure 100. The fan 420 forces heated air from within the housing 102 through the sintered filter 160 to the atmosphere. The displacement of air from the enclosure 100 to the atmosphere by the fan 420 also forces cooled air from the atmosphere into the housing 102 via the sintered filter 150. The cooled air from the atmosphere enters the housing 102, is heated by the heat produced from the automation equipment 110, and exits through the sintered filter 160.

In certain alternative embodiments, the fan 420 may be positioned proximate the sintered filter 150 and force cooled air into the housing 102 from the atmosphere and thus result in a displacement of hot air via sintered filter 160. In another embodiment, the fan 420 may be proximate the sintered filter 160 while a second fan (not shown) may be included and proximate the sintered filter 150. In yet another embodiment, the fan 420 may be located outside of the housing 102 on either side of filters 150, 160. In yet another embodiment, the fan 420 may not be present. The warm air inside of the enclosure 100 rises and exits through the filter 160, thus drawing cool air from the atmosphere into the enclosure 100 via filter 150. One having ordinary skill in the art will recognize that any number of configurations having a fan are possible.

In certain embodiments, the enclosure 100 may include a control system 450 for monitoring and controlling a cooling element, such as the fan 420. In alternative embodiments, the control system 450 monitors and controls a heating element. The control system 450 generally includes a sensor (not shown) that is coupled to a controller (not shown) that controls the heating or cooling element. The sensor actively or passively monitors conditions within the enclosure 100. Based on the conditions within the enclosure 100, the controller can turn on or off the heating or cooling element. For example, the sensor may be a temperature gauge that senses the temperature within the enclosure 100. When the sensor indicates that the temperature within the enclosure 100 is too high, the controller turns on the fan 420. Similarly, when the sensor indicates that the temperature within the enclosure 100 is low, the controller can turn on a heating element to heat the air within the enclosure 100. In some embodiments, the control system 450 cycles on and off passively. For example, the control system 450 can cycle such that the heating or cooling element is active for ten minutes every thirty minutes. In certain embodiments, the control system 450 includes a sensor capable of detecting humidity changes within the enclosure 100. If the sensor detects that the relative humidity within the enclosure 100 is too high, the control system 450 can turn on the fan 420 to facilitate air displacement from within the enclosure 100 to the exterior of the enclosure 100. In certain other embodiments, the control system 450 includes a sensor capable of determining whether an explosion has occurred by detecting a rapid temperature or pressure change. Upon detection of an internal explosion, the sensor communicates the state change to the controller which communicates the state change to a local indicator (not shown) or wirelessly to a remote location. One having ordinary skill in the art will recognize that the control system 450 can be programmed any number of ways to meet specifications of a given area and include any number or type of sensors to determine various states within the enclosure 100. In certain embodiments, the control system 450 is controlled wirelessly by a user in a remote location.

Figure 5:
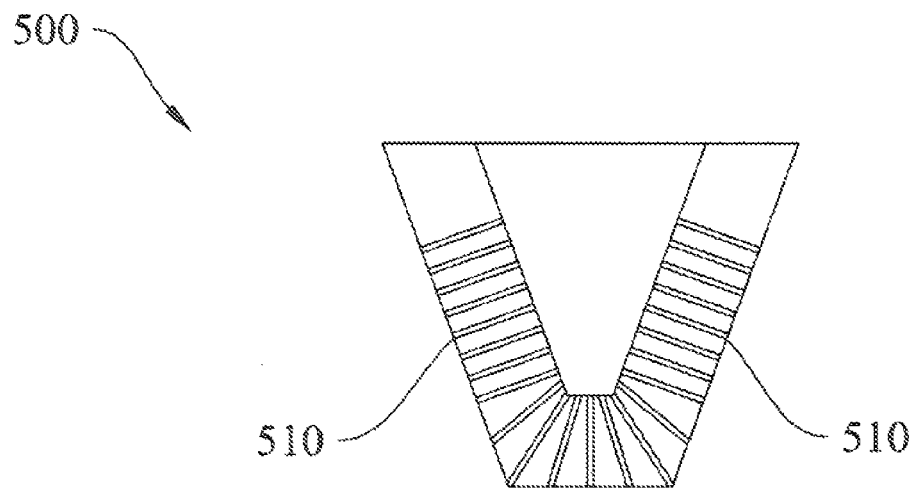
FIG. 5 is a cross-sectional view of a sintered filter that can be used in conjunction with the explosion-proof enclosure shown in FIG. 1 according to an exemplary embodiment.

FIG. 5 is a sectional view of a sintered filter 500 that can be used as sintered filters 150, 160 according to an exemplary embodiment. The sintered filter 500 has a substantially parabolic cross-section. The sintered filter 500 includes substantially linear channels 510 extending therethrough. The channels 510 have a length of about one inch and a pore size of about 38.1 microns. In certain alternative embodiments, the channels 510 have a pore size of about 101.6 microns. The sintered filter 500 has a thickness T1 of about one inch. In certain embodiments, the sintered filters 500 can withstand at least 560 pounds per square inch (psi) without fracturing or distorting.

Figure 6:
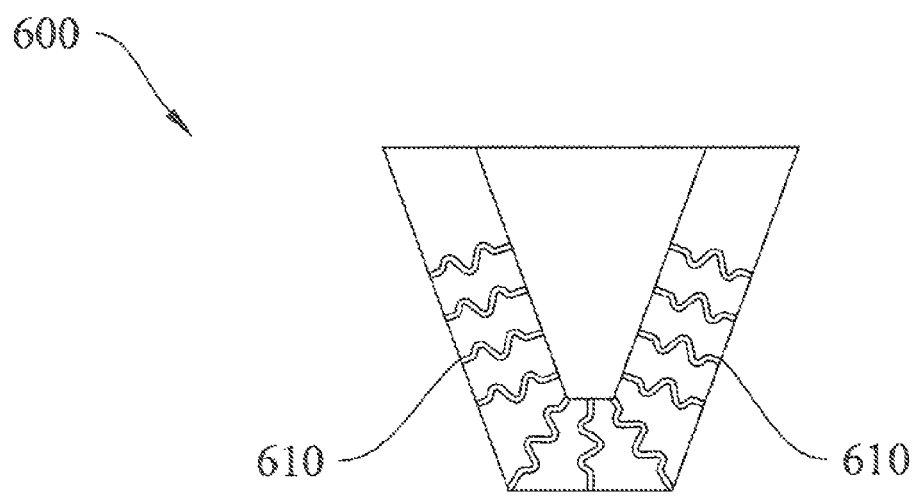
FIG. 6 is a cross-sectional view of a sintered filter that can be used in conjunction with the explosion-proof enclosure shown in FIG. 1 according to an alternative exemplary embodiment.

FIG. 6 is a sectional view of a sintered filter 600 that can be used as sintered filters 150, 160 according to an exemplary embodiment. The sintered filter 600 has a substantially parabolic cross-section. The sintered filter 600 includes channels 610 randomly extending therethrough. Each channel 610 has a length of about one inch and a pore size of about 38.1 microns. As such, the sintered filter 600 has a thickness T2 that may be less than about one inch. In certain alternative embodiments, each channel 610 has a pore size of about 101.6 microns. In certain embodiments, the sintered filter 600 can withstand at least 560 pounds per square inch (psi) without fracturing or distorting.

In alternative embodiments, sintered filters of the present invention may have channels that follow a curved, parabolic, helical, or other suitable path. Generally, the sintered filters of the present invention are designed based on controlling size and geometry of free volumes within the sintered filters, in other words, controlling pore size, and relating this pore size to the channels length. The sintered filters of the present invention may have any shape. The shape dictates the amount of airflow therethrough, and the directly correlates to the cooling performance of the sintered filters. A person having ordinary skill in the art and the benefit of this disclosure will recognize that the sintered filters of the present invention may include a number of channels having varying configurations to meet hazardous location requirements.

The sintered filters 500, 600 can be fabricated from any material that can withstand the dynamic effects of explosions without permanent distortion or damage. Suitable examples of sinter materials include, but are not limited to, ceramics, copper, glass, aluminum, stainless steel, other metal alloys such as austenitic nickel-based superalloys, reactive materials such as titanium, and thermally conductive polymers. The sintered filters 500, 600 are designed to allow air flow therethrough. In certain embodiments, the sintered filters 500, 600 are fabricated from a thermally conductive material and have a sufficient channel configuration (e.g. length, diameter) to arrest a flame so as to contain any explosion within the housing 102.

In an exemplary embodiment, the sintered filters 500, 600 can be produced using rapid prototyping, and more particularly, rapid manufacturing. As used herein, the terms "rapid prototyping" and "rapid manufacturing" refer to any technique related to the automated construction of physical objects using solid freeform fabrication. A particular time frame for fabrication is not implied by the terms. Suitable methods of manufacturing the exemplary sintered filters 500, 600 include, but are not limited to, Laser Engineered Net Shaping™ (LENS), or laser fusing, developed by Sandia National Laboratories, and Selective Laser Sintering™ (SLS) developed by 3D Systems, Inc. Fuse deposition techniques, combined with computational fluid dynamics, can allow accurate depositing of materials to create a sintered filter such that the creation of channels within the sintered filter can be controlled. The size and shape of these channels can be controlled as desired to produce a desired length and pore size for each flame path to adequately suppress a flame while providing the desired airflow therethrough.

The sintered filters of the present invention also can be produced by pressing together sinter material, such as small bronze balls about 200 microns in diameter or stainless steel flakes, in a die to form a substantially circular, square, or rectangular component. The component is then heated to a temperature below the actual melting point of the material but at a high enough temperature to allow the sinter particles to fuse together. The sinter particles fuse together in the areas where they are in contact with each other. Ultimately, the fused sinter particles form a matrix of channels within the component, thus forming a sintered element.

Figure 7:
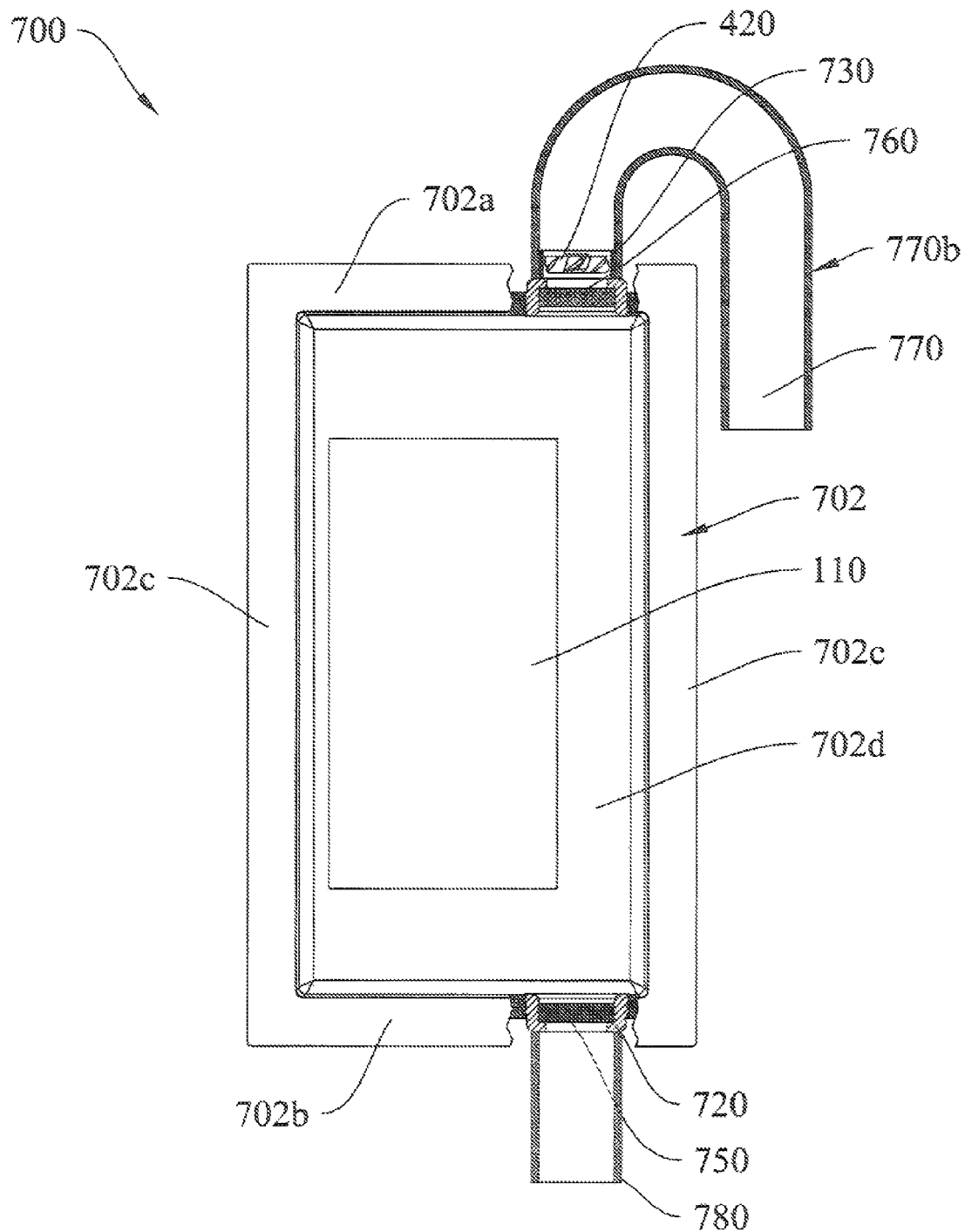
FIG. 7 is a sectional view of an explosion-proof enclosure according to an alternative exemplary embodiment.

FIG. 7 is a cross-sectional view of an explosion-proof enclosure 700 according to an alternative exemplary embodiment. The enclosure 700 differs from the enclosure 100 in that the enclosure 700 utilizes cylindrical-shaped sintered filters 750, 760 instead of filters 150, 160, and is ducted to prevent water from entering the enclosure 700. The enclosure 700 includes a housing 702 similar to the housing 102 of the enclosure 100. The housing 702 includes a top wall 702a, a bottom wall 702b, two side walls 702c, and a rear wall 702d. The enclosure 700 also includes automation equipment 110 positioned within the housing 702 and coupled to the rear wall 702d.

The enclosure 700 includes a filter holder 720 coupled to the housing 702. The filter holder 720 may be coupled to the housing 702 by any suitable means to maintain a seal. The filter holder 720 houses a sintered filter 750, further described below. The filter holder 720 extends outwardly from the bottom wall 702b and has a constant cross-sectional area. In certain embodiments, the filter holder 720 is cylindrically-shaped as shown. In certain alternative embodiments, the filter holder 720 has a variable cross-sectional area.

The enclosure 700 further includes another filter holder 730 coupled to the housing 702. The filter holder 730 may be coupled to the housing 702 by any suitable means that can maintain the hazardous rating integrity of the enclosure 100. The filter holder 730 houses a sintered filter 760, further described below. The filter holder 730 extends outwardly from the top wall 702a and has a constant sectional area. In certain embodiments, the filter holder 730 is cylindrically-shaped as shown in FIG. 7. In certain alternative embodiments, the filter holder 730 has a variable sectional area from an end adjacent to the enclosure 700 to an opposite end.

The sintered filters 750, 760 are substantially cylindrically-shaped. The sintered filters 750, 760 have a thickness that is substantially uniform throughout. In certain embodiments, the sintered filters 750, 760 have a thickness of about one inch. In certain embodiments, the thickness of the sintered filters 750, 760 is based on the flame arresting properties desired. The thickness of the sintered filters 750, 760 can vary as long as the path length of the apertures within is sufficient to dissipate the desired amount of heat. In certain embodiments, the path length of the apertures within is about one inch.

The filter holder 730 also includes a fan 420 proximate to the sintered filter 160 and positioned on the exterior of the housing 702. The fan 420 pulls heated air from within the housing 702 through the sintered filter 750 to the atmosphere. The displacement of air from the enclosure 700 to the atmosphere by the fan 420 also draws cooled air from the atmosphere into the housing 702 via the sintered filter 760.

In certain alternative embodiments, the fan 420 may be positioned proximate the sintered filter 760 and force cooled air into the housing 702 from the atmosphere and thus result in a displacement of hot air via sintered filter 750. In another embodiment, the fan 420 may be proximate the sintered filter 760 while a second fan (not shown) may be included and proximate the sintered filter 750. In yet another embodiment, the fan 420 may be located inside of the housing 702 on either side of filters 750, 760. In yet another embodiment, the fan 420 may not be present. The warm air inside of the enclosure 700 rises and exits through the filter 760, thus drawing cool air from the atmosphere into the enclosure 700 via filter 750. One having ordinary skill in the art will recognize that any number of configurations having a fan are possible.

In certain embodiments, the enclosure 700 includes a cylindrical tubing 770 coupled to filter holder 730, and is a NEMA 3, 4, or 9 compliant enclosure. The tubing 770 includes a bend 770b which aids in preventing water from entering the enclosure 700. The enclosure further includes a cylindrical tubing 780 coupled to filter holder 720. In certain alternative embodiments, the tubing 770, 780 can be coupled directly to the sintered filters 760, 750, respectively. The tubing 770, 780 provide ducting for the enclosure 700. In certain exemplary embodiments, the tubing 770, 780 are constructed from plastics, rubber, metals such as aluminum, brass, and stainless steel, corrosion-free materials, or plated or painted materials.

Therefore, the present invention is well adapted to attain the ends and advantages mentioned, as well as those that are inherent therein. The particular exemplary embodiments disclosed above are illustrative only, as the present invention may be modified and practiced in different but equivalent manners apparent to a person having ordinary skill in the art and the benefit of the teachings herein. Having described some exemplary embodiments of the present invention, the use of alternate sintered filter configurations having channels related to length and pore size is within the purview of those in the art. Additionally, while the present application discusses elliptic paraboloid and cylindrically-shaped sintered filters, it is understood that a number of other geometric configurations, such as rectangular-shaped, may be used based on the air displacement properties desired and using the teachings described herein. In addition, the exemplary embodiments of the present invention may be used to actively displace cold air from within the enclosures to the atmosphere. Furthermore, while the present application discusses the inclusion of two sintered filters in an enclosure, it is understood that the enclosures may include a single sintered filter, or multiple sintered filters. In embodiments where a single sintered filter is included, a breather, or a drain, can be included to displace any condensation that accumulates within the enclosure. While numerous changes to the invention may be made by a person having ordinary skill in the art, such changes are encompassed within the spirit of this invention as defined by the appended claims. Furthermore, the details of construction or design shown herein do not limit the invention, other than as described in the claims below. It is therefore evident that the particular exemplary embodiments disclosed above may be altered or modified and all such variations are considered within the scope and spirit of the present invention. The terms in the claims have their plain, ordinary meaning unless otherwise explicitly and clearly defined by the patentee.

What is claimed is:

1. An enclosure, comprising:
a housing having a cavity and a first opening in a first wall of the cavity;
a first porous media coupled to the first opening, wherein the first porous media comprises a plurality of channels, wherein air passes through the plurality of channels between the cavity and an exterior of the housing;
a first air displacement system positioned within the housing and proximate to the first porous media, wherein the first air displacement system, in conjunction with the first porous media, creates a pressure differential to force the air through the first porous media; and
a first tubular element coupled to the first porous media,
wherein the first porous media cools the cavity by passing the air to the exterior of the housing, and
wherein the plurality of channels of the porous media is manufactured using fuse deposition techniques and computational fluid dynamics to control a pore size and a shape of each of the plurality of channels within the porous media, wherein the pore size and the shape of each of the plurality of channels arrest a flame and thereby contain an explosion within the housing, while also providing a flow of the air, driven by the first air displacement system, through the plurality of channels in the absence of the explosion within the housing.

2. The enclosure of claim 1, wherein the porous media comprises a thermally conductive material, and is capable of arresting a flame exiting the housing.

3. The enclosure of claim 1, further comprising a first porous media holder, wherein the first porous media is positioned within the first porous media holder.

4. The enclosure of claim 3, wherein the first porous media holder is cylindrical-shaped and the first porous media is an elliptic paraboloid.

5. The enclosure of claim 1, further comprising a control system coupled to the first air displacement system.

6. The enclosure of claim 1, further comprising a second opening in the housing.

7. The enclosure of claim 6, further comprising a second porous media holder coupled to the second opening, wherein the second porous media holder is coupled to a second tubular element.

8. The enclosure of claim 6, further comprising a second porous media coupled to the second opening, the second opening positioned on a wall different from the first opening.

9. The enclosure of claim 8, further comprising a second porous media holder, wherein the second porous media is positioned within the second porous media holder, and wherein the second porous media holder is tapered.

10. The enclosure of claim 8, wherein the second porous media is an elliptic paraboloid.

11. The enclosure of claim 8, further comprising a second air displacement system positioned proximate the second porous media.

12. The enclosure of claim 11, further comprising a control system coupled to the second air displacement system.

13. The enclosure of claim 6, wherein the second opening comprises a vent.

14. The enclosure of claim 1, wherein the housing is suitable for potentially explosive environments.

15. The enclosure of claim 1, further comprising:
a heating or cooling element positioned within the cavity; and
a control system communicably coupled to the heating or cooling element, wherein the control system is positioned within the cavity.

16. The enclosure of claim 15, wherein the control system controls the first air displacement system.

17. An enclosure suitable for potentially explosive environments having active thermal management capabilities, comprising:
a housing having a cavity, and a first opening, and a second opening;
a porous media system comprising a porous media, wherein the porous media couples to the first opening of the housing, wherein the porous media comprises a plurality of channels, wherein the porous media system allows air to pass therethrough between the cavity and an exterior of the housing; and
an air displacement system disposed within the cavity, wherein the air displacement system, in conjunction with the porous media, allows the air to pass from the cavity through the porous media to the exterior of the housing,
wherein the porous media cools the cavity by passing the air to the exterior of the housing,
wherein the porous media arrests a flame to contain an explosion within the housing, and
wherein the plurality of channels of the porous media is manufactured using fuse deposition techniques and computational fluid dynamics to control a pore size and a shape of each of the plurality of channels within the porous media, wherein the pore size and the shape of each of the plurality of channels arrest a flame and thereby contain an explosion within the housing, while also providing a flow of the air, driven by the air displacement system, through the plurality of channels in the absence of the explosion within the housing.

18. The enclosure of claim 17, further comprising:
a control system comprising a sensor and a controller, wherein the sensor is a temperature gauge; and
a heating or cooling element coupled to the controller and positioned inside the housing, wherein the heating or cooling element is operable by the control system.

19. The enclosure of claim 17, wherein the air displacement system is coupled to the second opening and sealed to the housing.

20. The enclosure of claim 17, further comprising a porous media holder, wherein the porous media holder is coupled to the porous media and to the housing at the first opening.

* * * * *